United States Patent Office 3,293,057
Patented Dec. 20, 1966

3,293,057
MODIFIED STARCH COMPOSITION
George G. Rumberger, Kalamazoo, Mich., assignor, by mesne assignments, to Brown Company, a corporation of Delaware
No Drawing. Filed July 1, 1963, Ser. No. 292,122
28 Claims. (Cl. 106—212)

The present invention relates to modified starch compositions suitable for coatings, films, and fibers, and is more particularly concerned with compositions of starch which, in their cured state, are water-resistant and grease-resistant.

The excellent film-forming properties of starches, and especially cooked starches, have long been known. Of particular importance has been their utility as pigment binders for the coating of paper and fabrics. However, their sensitivity to water has precluded their wide use where moisture resistance of any sort, and especially liquid water resistance, is required. Another serious disadvantage of the starches has been the high viscosity of the solutions obtained, even after cooking, and it has previously been impossible to reduce the viscosity of the solutions without degrading the molecular weight of the starch or chemically modifying the starch molecule in such a way that the desirable film-forming property is impaired.

It is also well known that the addition of urea to starch compositions peptizes their solutions, presumably by interference with the hydrogen bonding of the molecules, to produce low viscosity solutions thereof. However, the addition of urea does not result in a satisfactory product since solid films deposited from these solutions are even less water-resistant than the films formed from starches alone. Moreover, the coating compositions generally have poorer film-forming properties.

It is an object of the present invention to provide a starch coating composition having low viscosity. It is a further object to provide such a low viscosity coating composition without impairment of the film-forming property of the composition and without impairment of the physical properties of the ultimate film. It is a further object to provide such a composition which may be set, as by means of heat, to form a substantially infusible film having excellent strength. It is still a further object to provide such a composition which may be set to form films having a high degree of water resistance. Additional objects will be apparent to one skilled in the art, and still other objects will become apparent hereinafter.

It has now been found that the foregoing advantages can be obtained by providing a composition comprising starch, urea, and a polyfunctional aldehyde curing agent. The composition is prepared by partially reacting the ingredients together in aqueous dispersion while maintaining the pH of the solution at a value no higher than about 7. The compositions are characterized by good film forming properties, and the films which may be formed from the compositions are very strong and have a high degree of water resistance, particularly when dried by heating.

Of the starches suitable for use in preparing the compositions of the invention, the most common is native pearl starch. Tapioca starch, potato starch, or wheat starch can likewise be used.

In addition, the chemically modified, molecularly degraded, and fractionated starches may be used. The chlorinated starches, hydroxyethylated and hydroxymethylated starches, ethylated starches, and the like can also be condensed with urea and polyfunctional aldehydes. The high amylopectin starches such as waxy maize starches, as well as the high amylose type fractions such as the high amylose content (above 50% amylose) corn starches from hybrid corn, may also be used. Successful compositions have been made from relatively pure amylopectin isolated from corn starch, as well as from the opposite fraction, amylose, fractionated from corn starch.

Of the polyfunctional aldehydes, the preferred material is starch, e.g., pearl starch, which has been oxidized, as with periodic acid, to form a dialdehyde starch. Oxidized starches may be used in which about 15 percent to 100 percent, preferably at least about 90 percent, of the 2,3-alcohol groups have been converted to aldehyde groups by the oxidation. Such 2,3-dialdehyde starches have been adequately described in the literature, especially in U.S. Patents 2,648,629, 2,713,553 and 2,880,236, and have more recently appeared on the market under the name of Sumstar, a product of the Miles Laboratories.

Other polyfunctional aldehydes which have been found satisfactory for use are glutaraldehyde, adipaldehyde, glyoxal, and the like. Also, polyfunctional aldehyde-generating materials such as 2-ethoxy-3,4-dihydro-2H-pyran, acrolein dimer (2-formyl-3,4-dihydro-2H-pyran), 2-alkoxytetrahydropyran, and the like, which generate polyfunctional aldehydes on hydrolysis, or in situ during the mixing process, can be used.

In order to obtain satisfactory products, it is necessary to maintain the pH during the reaction at a value no greater than about 7. If the pH is permitted to rise above this value, an undesirable Cannizzaro reaction may take place which may result in discoloration of the product. Moreover, if the Cannizzaro reaction is not inhibited, the polyfunctional aldehyde is consumed and a sufficient amount may not be available for condensation with the starch and urea. Further, if coating compositions having a pH greater than 7 are applied and dried on paper or paperboard, decomposition of the urea may occur, resulting in discoloration of the coating to yellow or brown and, further, in a reduction of the moisture resistance of the dried coating.

In order to maintain the proper pH, the reaction may be carried out in the presence of acidic catalysts, such as acids, acid salts, Lewis acids, and the like. Of the organic acids, such materials as acetic acid, formic acid, citric acid, or other water-soluble organic acids which will give a pH of about 2 to about 6.8 when added to the composition are suitable. Due to the presence of the urea, it is preferred that the acidic reagents be added in amounts sufficient to offset the presence of any ammonia or biuret formed during the curing of the composition, and such additions will generally be in excess of .1 percent by weight of the total solids in the composition.

In organic acids such as sufuric acid, phosphoric acids, hydrochloric acid, sulfurous acid, or even nitric acid may also be used. Of the acid salts potassium acid sulfate, sodium bisulfite, zinc chloride, zinc sulfate, aluminum sufate (alum), sodium nitrate, cupric chloride, and the like are suitable. In general, the use of colorless salts avoids unwanted discoloration of the final composition.

In combination with the foregoing acid-generating materials, I may also use buffering agents such as sodium acetate, sodium oxalate, potassium citrate, and the like to control the pH at a given level, within the range previously prescribed.

The proportions of the ingredients utilized in the present composition may be varied widely and are not unduly critical. Proportions within the following ranges may be used, based on total solids weight:

| | Percent |
|---|---|
| Starch | About 9–95 |
| Urea | About 5–80 |
| Polyfunctional aldehyde | About 0.5–20 |

The temperature of the reaction may also be varied widely and is not unduly critical. At low temperatures, however, the reaction rate is very slow. In general, temperatures above about 100° F. are employed, and substantial decreases in the required reaction time may be accomplished by utilizing temperatures of 180° F. or even higher to about the boiling point of water, or about 212° F.

During preparation of the present coating compositions, the condensation reaction is terminated short of complete condensation. The reaction is further advanced during the drying of the coated film. Additionally, a post-curing reaction takes place in the substantially dry coating which may require a period of up to ten days for completion. The post-curing period may be substantially reduced by the application of heat.

The compositions of the invention are particularly adaptable for use as coatings for paper and paperboard, and are especially valuable in producing relief surfaces obtained by casting against a glossy surface, such as a polished metal drum, metallic films or belts, or plastic surfaces. The surfaces of these compositions can also be cast against polished molds, and provide a release surface which is an exact replica of the casting surface used.

Another valuable property of the present compositions lies in their very high binding power for pigments, and pigments such as clays, titanium dioxide, and colored pigments, can be incorporated to as much as 85% by weight of the total composition without seriously detracting from the appearance and durability of the coating. Such high pigment loading is desirable for certain applications.

In addition to the foregoing primary ingredients of my composition, many modifiers can be added. Specifically, I find it advantageous to disperse in the coating compositions such materials as metallic soaps, waxes, resin emulsions, monoglycerides, and the like, especially when the surfaces of the coated sheets are to be dried by casting against a polished surface.

Particularly desirable additives for the composition are waxes, such as petroleum waxes, candelilla wax, beeswax, sterols, and the like. Particularly preferred waxes are the petroleum waxes, such as microcrystalline waxes and paraffin waxes, as are well known in the trade. The addition of these waxes is advantageous in providing additional water proofness, and sometimes water vapor proofness, to the consolidated films. These waxes can be advantageously added by first preparing an aqueous emulsion, with the addition of dispersing agents, such as fatty acid soaps of alkalis, amines, or alkanolamines. Particularly desirable dispersing agents for the waxes are morpholine soaps, which lose their morpholine on drying of the composition, and therefore give an irreversible deposition of the wax in the finished coating. However, for many uses, especially where high water proofness is not demanded, alkali soaps or alkanolamine soaps are equally suitable. In cases where it is undesirable to add the waxes in the form of an emulsion, they can also be added while the compositions are hot, by melting the wax, and finally dispersing it in the starch reaction product under high shear. Such dispersions have been found to be stable over long periods of storage.

An additional effective means of dispersing the waxes, especially paraffin waxes, in the compositions of this invention, is to first form a clathrate inclusion compound using part of the urea of the composition, by reacting it with the paraffin wax to form a urea-wax complex, and after the formation of this complex introducing it into the composition mass. Ordinarily, the amount of urea used will be about six times the amount of paraffin wax used.

Regardless of the method of addition of the wax to the composition, the wax, when present, will normally amount to about 0.5 to about 20 percent of the total solids in the composition.

It has been found that the compositions may be pigmented with the commonly used clays and pigments used in paper coatings, textile coatings, and the like, and a high degree of brightness and whiteness obtained, which is subsequently maintained after various converting operations, such as printing, waxing, lacquering, and the like. Due to the high grease resistance of the coatings, they are adaptable to the topical application of release coatings, such as silicones, which are maintained on the starch coating surface with a high degree of efficiency, and are therefore not easily lost by migration. In addition to paper and paperboard, the starch compositions of this invention can be applied to parchment, cellophane, metals, textiles, or like surfaces which are wettable by water. As a result of their high water resistance when applied on a substrate, the coatings are particularly useful for applications where contact with aqueous solutions is possible, such as offset printing, use in detergent cartons, and use in cartons for frozen or refrigerated materials subject to condensation of moisture or the formation of frost.

In addition to their use as coatings on paper, the present compositions can also be hot spun to form fibers which are insoluble in water. Such fibers may be used in fiber furnishes for fabrics, papers, and the like, or may be used for filling agents such as in pillows, life preservers, and the like.

The compositions may also be extruded or cast into films. Such films can be treated wtih lacquers, inks, and the like, to form wrapping materials, windows, and other uses wheer transparency is desired.

Films can for example be produced by casting on a release-surface, or by extrusion through a slit and drying, or by casting and coagulating and then drying, or by extrusion into a coagulating bath (such as a strong solution of aluminum chloride or the like). Fibers may be prepared, for example, by extrusion through a spinnerette and drying, or preferably by extrusion through a spinnerette into a coagulating bath and then drying, before and/or after stretching.

It has been found that coatings made from the present compositions, especially coatings on paper and paperboard, are particularly desirable for subsequent operations, such as printing, waxing, lacquering, application of hot melts, and the like. When produced with a glossy surface, the compositions, being greaseproof and water resistant, can be coated without change in the surface characteristics of the sheet. When provided with a high gloss coating, as by casting, the high gloss of the coating prevails even after printing or waxing and, in addition, staining or reversion of color is prevented, in contrast to ordinary coatings which often discolor upon application of topical treatments. Due to their high inherent gloss, the coating compositions according to the present invention, even when dried without being pressed against a glossy surface, are still characterized by the desired water-resistance and a relatively high degree of gloss. For highest gloss, of course, drying will be effected while the coating is pressed against a glossy surface.

The follownig examples are given to illustrate the process of the present invention but are in no way to be construed as limiting.

In all the examples below, where a Kady mill was used to mix the ingredients, the temperature of the reaction mixture was raised to the stated temperature, such as 180° F. or above, solely by the heat generated from mechanical working. Where other methods of mixing were used, and where required, external heat was applied to raise the reaction temperature to the stated value. All viscosity measurements were made with a Brookfield synchroelectric viscometer, at the indicated revolutions per minute. All determinations of gloss values were made on a Photovolt gloss meter at an angle of 75°.

*Example 1*

Sixty parts of corn pearl starch were slurried in 520 parts of water to form a creamy mixture. To this mixture were added 30 parts of urea and 10 parts of dialdehyde starch having a 90 percent dialdehyde content. The resulting mixture was then blended in a high shear mill (Kady mill) until a temperature of 180° F. was obtained, at which time a clear viscous mixture was obtained. This mixture had a pH of 6.5, and was applied to a white-surfaced paperboard (patent coated news). The coated sheet was then contacted with a glossy surface of Mylar film, a polyester film, and completely dried under pressure contact. When the board was peeled from the Mylar surface, it was found to have a very high gloss release surface which was greaseproof and resistant to wax. On applying three pounds per ream of wax to the surface of the starch-coated board, no discoloration took place. The surface was also found receptive to both letterpress and offset inks, and the high gloss of the substrate was retained.

*Example 2*

Sixty parts of pearl corn starch and 30 parts of urea were added to 520 parts by weight of water, and stirred until a milky slurry was produced. This composition was then raised to a temperature of 180° F. while working with a stirrer, after which it was reduced in temperature with stirring to 85° F. To this composition were added 10 parts of dialdehyde starch having a 90 percent dialdehyde content previously slurried in cold water and containing 4 percent sodium acetate. The two compositions were thoroughly mixed together and allowed to stand for 24 hours. The resulting composition was coated at room temperature on paperboard, which coating was then dried against the polished surface of a chromium plated drum. After drying of the coating, it was peeled from the chromium drum surface and found to have a very high gloss grease- and water-resistant coating, which was successfully printed with offset and letterpress inks, waxed, and subsequently exposed to contact with water, without loss of gloss.

*Example 3*

To 566 parts of water were added 60 parts of pearl corn starch, and a slurry was prepared by stirring. To the slurry were added 10 parts of dialdehyde starch having a 90 percent dialdehyde content, and 30 parts of urea. After the ingredients had been transformed into a slurry by stirring, one-tenth part by weight of citric acid was added. The batch was introduced into a Kady mill and worked for 10 minutes until a temperature of 185° F., developed from the mechanical working, had been reached. At this point the composition was a viscous syrupy liquid. The batch was then allowed to cool to room temperature and reworked by mixing, after which it had a viscosity of 71,000 centipoises when measured at 10 r.p.m. The pH of the composition was 4.8. The composition was then coated with a roll coater on paperboard having an initial gloss of forty percent. The wet coating was dried in pressure contact with a strip of highly polished polyester film with pressure contact produced by a fabric hold-down belt. After drying, the coated board was peeled from the polyester film and was found to have a gloss of 99 percent. After wetting of the coating with an offset printing fountain solution and subsequent drying, the gloss was found to have remained at 98 percent. In like manner the composition was coated on a coated cylinder board having an initial gloss of 57 percent, and the coating composition dried as previously. The initial gloss of the coating when the paperboard was removed from the casting surface was 99 percent, and remained as high as 94 percent after contacting the coating with an offset fountain solution and subsequent drying.

*Example 4*

To 566 parts of water were added 60 parts of pearl corn starch, 10 parts of dialdehyde starch having a 90 percent dialdehyde content, and 30 parts of crystalline urea. This was stirred with a mixer until a slurry, milky in appearance, was produced. To this batch was then added one gram of concentrated sulfuric acid dissolved in 10 parts of water, and the entire contents were mixed in a Kady mill until a temperature of 185° F. had been reached, at which point the composition acquired a fluid gel-like consistency. When reduced to room temperature the composition had a viscosity of 16,200 centipoises when measured at a spindle speed of 10 r.p.m., and a viscosity of 9,900 centipoises when measured at a spindle speed of 20 r.p.m. The pH of the composition was 3.1. When this composition was coated on paperboard and dried as in Example 3, a high gloss coating, measuring 92 percent, was obtained. After the coating had been permitted to age for 7 days and contacted for 5 minutes with water, there was no apparent loss of gloss.

*Example 5*

To 566 parts of water were added 60 parts of starch, 10 parts of dialdehyde starch having a 90 percent dialdehyde content, 30 parts of urea, and 1 part of zinc sulfate. The entire contents were mixed into a slurry at room temperature. The slurry was then introduced into a Kady mill and mixed for ten minutes while heating to 190° F. A gel-like structure was formed which, after cooling for 16 hours to 75° F., was cold worked for a period of time. The resulting composition had a viscosity at 75° F. of 10,900 centipoises when measured at 10 r.p.m., and a viscosity of 6,6000 centipoises when measured at 20 r.p.m. The pH of the composition was 6.8. When coated on paperboard and dried in contact with a glossy casting surface, the resulting coating had a gloss of 100 percent. The coating was highly resistant to wetting with water, and had a Dennison wax pick test value of 10.

*Example 6*

To 566 parts of water were added 35 parts of pearl corn starch, 10 parts of dialdehyde starch having a 90 percent dialdehyde content, and 55 parts of crystalline urea. After slurrying in the water at room temperature, the batch was heated to 180° F. while in a Kady mill for ten minutes. After cooling to room temperature, this composition set up to a stringy gel, which was coated upon paperboard by aid of a wire-wound May rod to obtain a solids coating of 3 pounds per thousand square feet. The coating was dried in pressure contact against a highly polished chromium drum. After release from the chromium drum, the gloss of the coated board was 100 percent. The gloss remained at 100 percent gloss after one pound per thousand square feet of wax was applied by means of a waxer.

*Example 7*

To 566 parts of water were added 90 parts of corn starch, 5 parts of urea, and 5 parts of dialdehyde starch having 95 percent dialdehyde content. A slurry was made in the water while at room temperature, whereafter the batch was transferred to a Kady mill and worked until a temperature of 180° F. had been reached, at which time the composition was in the form of a heavy gel. After cooling to room temperature, the composition was of the consistency of a dough, the viscosity of which was too high to be measured. The composition was used to laminate a sheet of glossy polyester film to paperboard by means of a roll-type laminator, and the two sheets were dried simultaneously while in pressure contact. The polyester film was then stripped away, after which the coating remaining on the paperboard had a gloss of 95 percent. After aging for 7 days at room temperature, the coated sheet was found to be completely resistant to the penetration of water and had a pick test value of 9 to 10.

*Example 8*

To 566 parts of water were added 55 parts of pearl starch, 40 parts of dialdehyde starch having a 90 percent dialdehyde content, and 5 parts of urea. The batch, after a slurry was produced, was transferred to a Kady mill and milled for ten minutes, after which period the temperature was 180° F., and the composition was in the form of a heavy gel. The pH of the composition was 4.5. The composition was cast while still hot on paperboard, and brought in contact with a glossy polyester film. The composition was dried while in pressure contact. When the coated board was srtipped from the polyester film it was found to have a gloss of 100 percent, which was maintained at 98 percent after contacting with an offset printing fountain solution and drying.

*Example 9*

To 566 parts of water were added 60 parts of pearl starch, 10 parts of dialdehyde starch having a 90 percent dialdehyde content, 30 parts of urea, and 50 parts of pigment grade hydrated aluminum oxide. The batch was worked at high shear in a Kady mill until a temperature of 180° F. had been reached. After cooling to room temperature, the composition, which had a viscosity of 7,000 centipoises, was applied to paperboard, and then dried in pressure contact with a polished chromium drum. When peeled from the drum, the coated paperboard had a gloss of 95 percent and a GE brightness of 78 percent. After waxing, the brightness was 75 percent.

*Example 10*

To 566 parts of water were added 60 parts of pearl corn starch, 10 parts of dialdehyde starch having a 90 percent dialdehyde content, and 30 parts of urea, and the entire contents slurried to form a creamy mixture. The batch was then placed in a high speed Kady mill and mixed at high shear until a temperature of 180° F. was reached, after which 10.8 grams of paraffin in the form of a paraffin wax emulsion was added. The whole composition was then stirred for an additional five minutes at low shear, and cooled to room temperature. The composition had a viscosity of 12,000 centipoises when measured at 10 r.p.m. and a pH of 7.0. This composition was coated on paperboard and dried in contact with a polished chromium drum, after which the coated board had a gloss of 98 percent. The coated board was characterized by a very slippery feel, good printing characteristics, and had a high water resistance as indicated by a contact angle with pure water of 102°.

*Example 11*

To 600 parts of water were added 258 parts of low viscosity hypochlorite-oxidized starch, commonly known as chlorinated starch (Stayco M), 47 parts of urea and 47 parts of dialdehyde starch having a 95 percent dialdehyde content which had been dissolved in 522 parts of water containing 4 parts of sodium acetate. The slurry thus obtained was mixed in a Kady mill at high shear until a temperature of 205° F. had been reached. At this stage the composition was a mobile fluid. The cold composition was coated on paperboard, dried and cast against the surface of a highly polished surface drum by heating. After the coated sheet was dry, it was peeled from the chromium drum and found to have a gloss of 97 percent. The coated sheet material had a 90° contact angle with water.

*Examples 12–19*

Formulas were made up of various oxidized starches as follows:

| | Parts |
|---|---|
| Oxidized starch | 10 |
| Urea | 3.5 |
| Citric acid | 1 |
| H₂O | 100 |

The oxidized starch and urea were added to the water and heated in a water bath to 180° F. with constant stirring. Then citric acid was added, and the dispersion stirred until a colloidal solution was obtained. The oxidized starches were as follows.

| Examples: | Percent dialdehyde content |
|---|---|
| 12. Oxidized pearl starch | 90 |
| 13. Oxidized pearl starch | 53 |
| 14. Oxidized pearl starch | 20 |
| 15. Oxidized pearl starch | 10 |
| 16. Oxidized amylopectin | 90 |
| 17. Oxidized amylose | 90 |
| 18. Oxidized high maize starch | 90 |
| 19. Oxidized high amylose starch | 90 |

Into the above solutions was dissolved pearl starch in amounts of from 1:1 to 20:1 ratios based on the oxidized starch present. These solutions were cast hot on metal plates and dried at 210° F., after which the films were stripped off. All films obtained were relatively insoluble in water up to 130° F., with the exception of those made from dialdehyde starch having only 10% dialdehyde content.

*Example 20*

The procedure of Example 1 was followed in preparing a coating mixture, except that 10 parts of 2-ethoxy-3,4-dihydro-2H-pyran were substituted for the dialdehyde starch. Also one part of citric acid was added to aid in hydrolysis of the pyran, and to reduce the pH to 3.5. This composition, when coated on paperboard, was in all respects equivalent to the coating of Example 1.

*Example 21*

The procedure of Example 1 was repeated except that 10 parts of glutaraldehyde were substituted for the dialdehyde starch. This coating, when coated on paper and paperboard, was equivalent in all respects to the composition of Example 1.

*Example 22*

The procedure of Example 1 was duplicated, except that 3.1 parts of glyoxal were substituted for the dialdehyde starch. When coated on paper and paperboard, this coating was in all respects equivalent to the coating of Example 1.

Various modifications and equivalents will be apparent to one skilled in the art and may be made in the compositions and method of the present invention without departing from the spirit or scope thereof, and it is therefore to be understood that the invention is to be limited only by the scope of the appended claims.

I claim:

1. A composition prepared by mixing together and reacting at an elevated temperature an aqueous dispersion of individual ingredients comprising starch, urea, and a polyfunctional aldehyde, wherein said starch is present in an amount of about 9% to about 95% by weight, said urea is present in an amount of about 5% to about 80% by weight, and said aldehyde is present in an amount of about 0.5% to about 20% by weight, all based on the total solids weight of said compositions, the pH of said dispersion being no greater than about 7.

2. A composition according to claim 1, wherein said polyfunctional aldehyde is dialdehyde starch.

3. A composition according to claim 2, wherein the dialdehyde starch contains about 15% to 100% starch 2,3-dialdehyde.

4. A composition according to claim 2, wherein the dialdehyde starch contains at least about 90% starch 2,3-dialdehyde.

5. A composition according to claim 1, wherein said aldehyde is glyoxal.

6. A composition according to claim 1, wherein said aldehyde is glutaraldehyde.

7. A composition according to claim 1, wherein said aldehyde is produced by hydrolysis of 2-ethoxy-3,4-dihydro-2H-pyran.

8. A composition according to claim 7, additionally containing an amount of citric acid sufficient to maintain the pH during the reaction at a value no greater than about 7.

9. A composition according to claim 1, comprising from about 1% to about 20% of wax, by weight of said starch.

10. A composition according to claim 1, comprising a pigment.

11. A relatively water-resistant film resulting from dehydration of a composition according to claim 1.

12. A relatively water-resistant film resulting from dehydration of a composition according to claim 2.

13. A composition prepared by mixing together and reacting at an elevated temperature to a point short of completion an aqueous dispersion of individual ingredients comprising starch, urea, and a polyfunctional aldehyde, wherein said starch is present in an amount of about 9% to about 95% by weight, said urea is present in an amount of about 5% to about 80% by weight, and said aldehyde is present in an amount of about 0.5% to about 20% by weight, all based on the total solids weight of said composition, the pH of said dispersion being no greater than about 7.

14. A composition prepared by mixing together and reacting at an elevated temperature to a point short of completion an aqueous dispersion of individual ingredients comprising starch, urea, and dialdehyde starch, wherein said starch is present in an amount of about 9% to about 95% by weight, said urea is present in an amount of about 5% to about 80% by weight, and said aldehyde is present in an amount of about 0.5% to about 20% by weight, all based on the total solids weight of said composition, the pH of said dispersion being no greater than about 7.

15. A coated product having a relatively water-resistant coating which comprises the reaction product prepared by mixing together and reacting at an elevated temperature an aqueous dispersion of individual ingredients comprising starch, urea, and polyfunctional aldehyde, wherein said starch is present in an amount of about 9% to about 95% by weight, said urea is present in an amount of about 5% to about 80% by weight, and said aldehyde is present in an amount of about 0.5% to about 20% by weight, all based on the total solids weight of said composition.

16. A coated product according to claim 15, wherein said polyfunctional aldehyde is dialdehyde starch.

17. A coated paper product having a relatively water-resistant coating which comprises the reaction product prepared by mixing together and reacting at an elevated temperature an aqueous dispersion of individual ingredients comprising starch, urea, and a polyfunctional aldehyde, wherein said starch is present in an amount of about 9% to about 95% by weight, said urea is present in an amount of about 5% to about 80% by weight, and said aldehyde is present in an amount of about 0.5% to about 20% by weight, all based on the total solids weight of said composition.

18. A coated paper product according to claim 17, wherein said polyfunctional aldehyde is dialdehyde starch.

19. A fibrous material comprising the reaction product prepared by mixing together and reacting at an elevated temperature an aqueous dispersion of individual ingredients comprising starch, urea, and a polyfunctional aldehyde, wherein said starch is present in an amount of about 9% to about 95% by weight, said urea is present in an amount of about 5% to about 80% by weight, and said aldehyde is present in an amount of about 0.5% to about 20% by weight, all based on the total solids weight of said composition.

20. A fibrous material according to claim 19, wherein said aldehyde is dialdehyde starch.

21. A process for the production of a coating composition which comprises concurrently mixing and reacting together at an elevated temperature starch, urea, and a polyfunctional aldehyde in aqueous dispersion at a pH no higher than about 7, wherein said starch is present in an amount of about 9% to about 95% by weight, said urea is present in an amount of about 5% to about 80% by weight, and said aldehyde is present in an amount of about 0.5% to about 20% by weight, all based on the total solids weight of said composition.

22. A process according to claim 21, wherein the temperature of the reaction is in the range of about 100° F. to about 212° F.

23. A process according to claim 22, wherein said aldehyde is dialdehyde starch.

24. A process according to claim 23, wherein the dialdehyde starch contains about 15% to 100% starch, 2,3-dialdehyde.

25. A process according to claim 23, wherein the dialdehyde starch contains at least about 95% starch 2,3-dialdehyde.

26. A process according to claim 21, wherein said aldehyde is glyoxal.

27. A process according to claim 21, wherein said aldehyde is glutaraldehyde.

28. A process according to claim 21, wherein said aldehyde is produced by hydrolysis of 2-ethoxy-3,4-dihydro-2H-pyran.

References Cited by the Examiner
UNITED STATES PATENTS

| | | | |
|---|---|---|---|
| 2,099,765 | 11/1937 | Von der Horst et al. | 106—213 |
| 2,988,455 | 6/1961 | Rosenberg et al. | 106—210 |
| 3,066,035 | 11/1962 | Albert | 106—214 |
| 3,127,393 | 3/1964 | Thayer. | |
| 3,145,116 | 8/1964 | Zienty | 106—210 |
| 3,169,073 | 2/1965 | Weakley et al. | 106—139 |
| 3,169,076 | 2/1965 | Brochert | 106—210 |

MORRIS LIEBMAN, *Primary Examiner.*

ALEXANDER H. BRODMERKEL, *Examiner.*

L. HAYES, *Assistant Examiner.*